(12) United States Patent
Ji

(10) Patent No.: US 12,355,774 B1
(45) Date of Patent: Jul. 8, 2025

(54) AUTOMATIC USER AUTHENTICATION WITH PROXY SERVERS

(71) Applicant: DLD Technologies Corporation, Santa Clara, CA (US)

(72) Inventor: Shuang Ji, Los Gatos, CA (US)

(73) Assignee: DLD Technologies Corporation, Los Gatos, CA (US)

( * ) Notice: Subject to any disclaimer, the term of this patent is extended or adjusted under 35 U.S.C. 154(b) by 120 days.

(21) Appl. No.: 18/330,753

(22) Filed: Jun. 7, 2023

Related U.S. Application Data

(60) Provisional application No. 63/349,870, filed on Jun. 7, 2022.

(51) Int. Cl.
| | |
|---|---|
| *G06F 15/16* | (2006.01) |
| *G06F 9/54* | (2006.01) |
| *H04L 9/40* | (2022.01) |
| *H04L 29/06* | (2006.01) |
| *H04L 67/561* | (2022.01) |

(52) U.S. Cl.
CPC ........ *H04L 63/102* (2013.01); *H04L 63/0884* (2013.01); *H04L 67/561* (2022.05)

(58) Field of Classification Search
CPC ........................... H04L 63/0884; H04L 67/561
USPC .............................................................. 726/4
See application file for complete search history.

(56) References Cited

U.S. PATENT DOCUMENTS

| | | | | |
|---|---|---|---|---|
| 7,506,368 B1 * | 3/2009 | Kersey | ...................... | H04L 9/14 726/12 |
| 7,734,683 B1 * | 6/2010 | Bergenwall | ......... | H04L 61/5014 709/224 |
| 2001/0027492 A1* | 10/2001 | Gupta | ................. | G06F 16/9566 707/E17.115 |
| 2002/0165928 A1* | 11/2002 | Landfeldt | ............. | H04L 67/303 709/213 |
| 2004/0006615 A1* | 1/2004 | Jackson | ................ | H04L 67/288 709/223 |
| 2011/0004926 A1* | 1/2011 | O'Donnell, III | ...... | H04L 9/3271 726/3 |
| 2011/0231479 A1* | 9/2011 | Boydstun | ............ | H04L 67/1001 709/203 |
| 2013/0067086 A1* | 3/2013 | Hershko | ............. | H04L 65/1045 709/225 |

(Continued)

*Primary Examiner* — Hamza N Algibhah

(74) *Attorney, Agent, or Firm* — PATENT LAW WORKS LLP

(57) ABSTRACT

A system and method for implementing a non-interactive and automatic way of facilitating user authentication with a proxy server is disclosed. At least, the technique disclosed includes determining a request to access a web server by a Hypertext Transfer Protocol (HTTP) agent on a client device, retrieving a proxy configuration file from a Uniform Resource Locator (URL) assigned to the client device, determining, using the proxy configuration file, a host name and a port number of a proxy server corresponding to the request, and routing, from the HTTP agent to the proxy server, the request using the host name and the port number of the proxy server, the proxy server configured to look up a user mapping table using a set of proxy connection information and uniquely identify a user of the client device based on the look up, the set of proxy connection information including a combination of a public Internet Protocol (IP) address of the client device, the host name of the proxy server, and the port number of the proxy server.

20 Claims, 6 Drawing Sheets

(56) References Cited

U.S. PATENT DOCUMENTS

| | | | |
|---|---|---|---|
| 2015/0127837 A1* | 5/2015 | Harashima | H04L 67/63 709/227 |
| 2018/0367619 A1* | 12/2018 | Jung | H04L 67/564 |
| 2019/0150027 A1* | 5/2019 | Ner | H04L 47/127 370/235 |
| 2019/0386961 A1* | 12/2019 | Kupisiewicz | H04L 61/4511 |
| 2020/0169535 A1* | 5/2020 | Chaubey | H04L 67/56 |
| 2020/0186501 A1* | 6/2020 | Neystadt | H04L 63/08 |
| 2020/0374197 A1* | 11/2020 | Vysotsky | H04L 45/22 |
| 2020/0374229 A1* | 11/2020 | Vysotsky | H04L 41/12 |
| 2021/0157619 A1* | 5/2021 | Singh | G06F 8/427 |
| 2022/0103525 A1* | 3/2022 | Shribman | H04L 63/0272 |
| 2023/0033907 A1* | 2/2023 | Akhter | G06F 21/335 |
| 2024/0028348 A1* | 1/2024 | Saravanaperumal | H04L 67/56 |
| 2024/0391464 A1* | 11/2024 | Cardona | G06N 20/00 |

\* cited by examiner

AUTOMATIC USER AUTHENTICATION WITH PROXY SERVERS

CROSS-REFERENCE TO RELATED APPLICATIONS

The present application claims priority, under 35 U.S.C. § 119, of U.S. Provisional Patent Application No. 63/349,870, filed Jun. 7, 2022, and entitled "Automatic Authentication of HTTP Clients with Proxy Servers," which is incorporated by reference in its entirety.

BACKGROUND

The specification generally relates to implementing a technique for automatic user authentication with a proxy server. In particular, the specification relates to a system and method for implementing a non-interactive, automatic way of authenticating a user of a client device with a proxy server.

A Hypertext Transfer Protocol (HTTP) proxy server is an intermediary server that acts as a bridge between a client requesting a resource and a web server providing that resource. Proxy servers are easy to deploy at various network levels. Until recently, proxy servers were deployed on-premises in the form of appliances. With the rise of cloud computing services, cloud proxy servers are gaining momentum because they relieve Information Technology (IT) administrators of the tasks of maintaining and servicing on-premises appliances while providing high availability. It is important that user identities be known to the proxy servers to get the desired benefits out of them. As such, there is a persistent need for a technique that facilitates a non-interactive and automatic way of user authentication with proxy servers.

This background description provided herein is for the purpose of generally presenting the context of the disclosure.

SUMMARY

The techniques introduced herein overcome the deficiencies and limitations of the prior art, at least in part, with a system and method for implementing a non-interactive, automatic way of authenticating a user of a client device with a proxy server.

According to one innovative aspect of the subject matter described in this disclosure, a method includes: determining a request to access a web server by a Hypertext Transfer Protocol (HTTP) agent on a client device, retrieving a proxy configuration file from a Uniform Resource Locator (URL) assigned to the client device, determining, using the proxy configuration file, a host name and a port number of a proxy server corresponding to the request, and routing, from the HTTP agent to the proxy server, the request using the host name and the port number of the proxy server, the proxy server configured to look up a user mapping table using a set of proxy connection information and uniquely identify a user of the client device based on the look up, the set of proxy connection information including a combination of a public Internet Protocol (IP) address of the client device, the host name of the proxy server, and the port number of the proxy server.

According to another innovative aspect of the subject matter described in this disclosure, a system includes: one or more processors; a memory storing instructions, which when executed cause the one or more processors to: determine a request to access a web server by a Hypertext Transfer Protocol (HTTP) agent on a client device, retrieve a proxy configuration file from a Uniform Resource Locator (URL) assigned to the client device, determine, using the proxy configuration file, a host name and a port number of a proxy server corresponding to the request, and route, from the HTTP agent to the proxy server, the request using the host name and the port number of the proxy server, the proxy server configured to look up a user mapping table using a set of proxy connection information and uniquely identify a user of the client device based on the look up, the set of proxy connection information including a combination of a public Internet Protocol (IP) address of the client device, the host name of the proxy server, and the port number of the proxy server.

These and other implementations may each optionally include one or more of the following features. For instance, the features may include retrieving the proxy configuration file from the URL assigned to the client device comprising sending, from the HTTP agent to a proxy configuration server, a request for the proxy configuration file at the URL, receiving, from the proxy configuration server, a response including the proxy configuration file, and the proxy configuration server configured to perform operations comprising identifying a parameter including a user identifier of the user in the URL, determining a public IP address of the client device based on the request for the proxy configuration file, determining a host name and a port number of an available proxy server cluster corresponding to the public IP address, creating a set of proxy connection information including the public IP address, the host name and the port number of the available proxy server cluster, updating the user mapping table with an entry for the set of proxy connection information corresponding to the user identifier, and generating the proxy configuration file using the set of proxy connection information. For instance, the features may include periodically refreshing, using Domain Name System (DNS) protocol, the set of proxy connection information included in the proxy configuration file comprising sending a DNS query in association with the proxy configuration file to a DNS server, receiving a response encoded in an IP address from the DNS server, and wherein the DNS server is configured to perform operations comprising determining whether a mapping from a device identifier in the DNS query to a set of proxy connection information is present in the user mapping table, sending a host name and a port number of a special proxy server cluster to the client device to connect responsive to determining that the mapping from the device identifier in the DNS query to the set of proxy connection information is absent in the user mapping table, determining a connection between the client device and the special proxy server cluster, determining a public IP address of the client device based on the connection, creating a set of proxy connection information in the user mapping table using the public IP address of the client device corresponding to the device identifier in the DNS query, and sending the set of proxy connection information to the client device. For instance, the features may include the DNS query including one or more of a user identifier, a device identifier, and the port number of the proxy server forming a fake host name, the proxy server configured to uniquely identify the user of the client device without redirecting the HTTP agent to an interactive login at the client device, the HTTP agent including a web browser, the URL including an embedding of a user identifier and a device identifier, the proxy configuration file including a proxy auto-configuration (PAC) file, and the response encoded in the IP address from the DNS server being cached for a period indicated by Time to Live (TTL).

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

The features and advantages described herein are not all-inclusive and many additional features and advantages will be apparent in view of the figures and description. Moreover, it should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
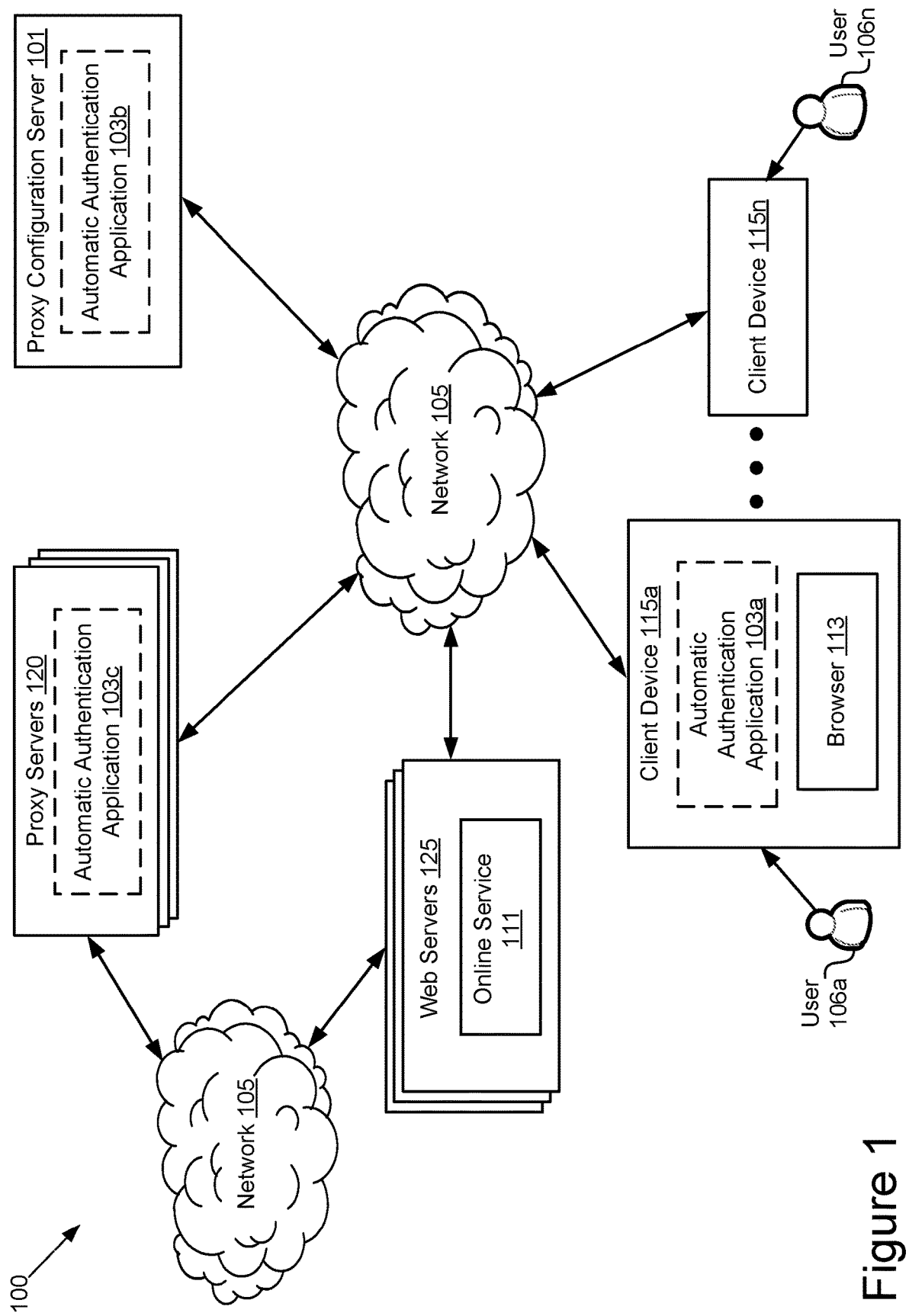
FIG. 1 is a high-level block diagram illustrating one implementation of an example system for implementing a non-interactive and automatic way of facilitating user authentication with a proxy server.

In the following disclosure, an automatic authentication application 103 is used to facilitate a non-interactive and automatic user authentication with a proxy server. It is important for user identities to be known to the proxy server so that it can apply the content policies, filter content, and record user activities for future auditing. One existing technique of authenticating user identities is to redirect a web browser on a client device to an interactive login page. Once the user of the client device authenticate themselves using a username and password, the proxy server may plant tracking data (e.g., cookies) into the web browser so that the user need not log in again for future traffic. This may work if users are using web browsers as Hypertext Transfer Protocol (HTTP) clients or agents. However, this may not work in other scenarios. For example, certain users, such as kindergarten kids may not remember their user credentials to enter them correctly into an interactive login page on the client device. In another example, applications without HTTP browser interfaces (e.g., system update processes, streaming video applications, such as YouTube™, news applications, etc.) may not support an interactive login on the client device. In another example, applications on the client device may have their own cookie storage which is not shared. This means even if the user has authenticated themselves using a web browser on a client device, other applications on the same device are not authenticated to the proxy servers and they may never be able to authenticate themselves to the proxy servers because of the above limitation. In another example, some non-browser applications on the client device may not accept cookies. Such applications may render a user interface on the client device and use application programming interfaces (APIs) that obey Representational State Transfer (REST) constraints to get structured data from the servers. Instead of cookies, RESTful web APIS often use a bearer token in the HTTP request headers to authenticate themselves to the RESTful servers. In yet another example, some non-browser applications on the client device may not handle HTTP 30x redirect responses. The proxy server may send the HTTP 30X responses to redirect the HTTP client to an interactive login page or communicate with some components on the client side with some specially formed Uniform Resource Locators (URLs).

When a proxy server accepts a connection from an HTTP agent on a client device, the proxy server may identify connection information including the client public Internet Protocol (IP) address, the client port number, the proxy server IP address, and the port number that the HTTP agent is connecting to on the proxy server. The present disclosure is particularly advantageous because it provides a system and method for implementing a non-interactive and automatic way of facilitating user authentication with a proxy server by using a combination of the connection information.

For instance, the client public IP address is usually fixed for the same client device for a certain period of time, until the client device moves to a different location or switches to a different network. The client public IP address may suitably be used as part of the connection information to identify the user. The client port number is randomly selected by the Operating System (OS) kernel on the client device and may likely vary with each HTTP request made by the client device. Therefore, the client port number may not be suitably used as part of the connection information to identify the user. If the client device connects to the same instance of the proxy server at a fixed public IP address, the proxy server public IP address may be used as part of the connection information to identify the user. However, this is not feasible because server public IP addresses are limited. If a unique server public IP address is assigned to each client device, the pool of available IP addresses may get used up quickly. Also, if the proxy server instance goes down, the client device may not be able to access the Internet until a new server public IP address is assigned to it. Therefore, the proxy server IP address may not be suitably used as part of the connection information to identify the user. In contrast, the server port number may be used as part of the connection information to identify the user. The number of server ports is limited. For example, the maximum number of Transmission Control Protocol (TCP) ports on a server is 65535. However, in reality, the number of usable ports may be in the range between 20,000 and 30,000. Based on the above observations, the present disclosure discloses a technique to use a tuple or set of proxy connection information including the client public IP address and proxy server port number to uniquely identify the user.

It is not uncommon for multiple users/client devices to connect to the proxy server from behind the same client public IP address. In such cases, the technique disclosed in the present disclosure directs the users/client devices to use different proxy server ports for enabling successful user authentication. Client devices from different public IP addresses may share the same proxy server port and the technique disclosed in the present disclosure can still correctly identify the users. This is because the total number of different users that a proxy server can handle is the product of the number of possible public IP addresses and the number of available ports on the proxy server. If the number of users/client devices behind the same public IP address exceeds the number of available ports on the proxy server, the technique disclosed in the present disclosure addresses this scalability problem by implementing multiple proxy server clusters, where each proxy server cluster is identified by a different host name or cluster ID. This solution enables the user to be uniquely identified by a tuple or set of proxy connection information including the proxy server cluster ID or proxy host name, client public IP address, and proxy server port number. For example, when the number of users behind the same client public IP address exceeds or overflows the number of available ports on the proxy server cluster, the rest of the users may be instructed to use the proxy servers in other clusters. Furthermore, the techniques disclosed in the present disclosure enhances the scalability and high availability by implementing multiple proxy server instances in each cluster, where each instance is sharing the same proxy host name. The number of client devices that each proxy server cluster can handle from the same client public IP address is still limited by the number of proxy server ports available in that cluster.

FIG. 1 is a high-level block diagram illustrating one implementation of an example system 100 for implementing a non-interactive and automatic way of facilitating user authentication with a proxy server. The illustrated system 100 may have one or more client devices 115a . . . 115n that can be accessed by users 106a . . . 106n, a proxy configuration server 101, a plurality of proxy servers 120, and a plurality of web servers 125. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105 for interaction and electronic communication with one another. While one implementation of the functionality of the system 100 is described below with reference to the client-server architecture shown in FIG. 1, it should be understood that the functionality of the system 100 may be implemented in other architectures.

The network 105 may be a conventional type, wired or wireless, and may have numerous different configurations including a star configuration, token ring configuration, or other configurations. Furthermore, the network 105 may include any number of networks and/or network types. For example, the network 105 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, near field networks (e.g., NFC, etc.), and/or other interconnected data paths across which multiple devices may communicate, various combinations thereof, etc. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 105 may include packetized data (e.g., Internet Protocol (IP) data packets) that is routed to designated computing devices coupled to the network 105. Although FIG. 1 illustrates one network 105 coupled to the client devices 115, the proxy configuration server 101, the plurality of proxy servers 120, and the plurality of web servers 125, in practice one or more networks 105 can be connected to these entities.

The client devices 115a . . . 115n (also referred to individually and collectively as 115) may be computing devices having data processing and communication capabilities. In some implementations, a client device 115 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 115a . . . 115n may couple to and communicate with one another and the other entities of the system 100 via the network 105 using a wireless and/or wired connection. Examples of client devices 115 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing a network 105.

In the example of FIG. 1, the client device 115a is configured to implement an automatic authentication application 103a described in more detail below. The client device 115 includes a display for viewing information provided by one or more entities coupled to the network 105. For example, the client device 115 may be adapted to send and receive data to and from one or more of the proxy configuration server 101, the proxy servers 120, and the web servers 125. While FIG. 1 illustrates two client devices 115a and 115n, the disclosure applies to a system architecture including any number of client devices 115. In addition, the client devices 115a . . . 115n may be the same or different types of computing devices. The client devices 115a . . . 115n may be associated with the users 106a . . . 106n. For example, users 106a . . . 106n may be authorized personnel including data managers, data analysts, admins, end users, engineers, technicians, administrative staff, etc. of a business organization. In another example, users 106a . . . 106n may be individuals including teachers, students, administrative staff, parents, Internet Technology (IT) personnel, etc. of a K-12 school district. In some implementations, the client device 115 may run a user application. The user application may include web, mobile, enterprise, and cloud application. For example, the client device 115 may include a web browser 113 that may run JavaScript or other code to allow the user 106 of the client device 115 to access the functionality provided by other entities of the system 100 coupled to the network 105. In some implementations, the client device 115 may be implemented as a computing device 200 as will be described below with reference to FIG. 2.

In the example of FIG. 1, the system 100 may include a proxy configuration server 101, a plurality of proxy servers 120, and a plurality of web servers 125 coupled to the network 105. The entities 101, 120, and 125 may be, or may be implemented by, a computing device including a processor, a memory, applications, a database, and network communication capabilities similar to that described below with reference to FIG. 2.

In some implementations, each one of the entities 101, 120, and 125 of the system 100 may be a hardware server, a software server, or a combination of software and hardware. For example, each one of the entities 101, 120, and 125 may include one or more hardware servers, virtual servers, server arrays, storage devices and/or systems, etc., and/or may be centralized or distributed/cloud-based. In some implementations, each one of the entities 101, 120, and 125 of the system 100 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, each one of the entities 101, 120, and 125 of the system 100 may be a Hypertext Transfer Protocol (HTTP) server, a Representational State Transfer (REST) service, or other server type, having structure and/or functionality for processing and satisfying content requests and/or receiving content from the other entities 101, 120, and 125 and one or more of the client devices 115 coupled to the network 105. Also, instead of or in addition, each one of the entities 101, 120, and 125 of the system 100 may implement its own application programming interface (API) for facilitating access and the transmission of instructions, data, results, and other information to other one of the entities 101, 120, and 125 communicatively coupled to the network 105.

In the example of FIG. 1, the components of the proxy configuration server 101 may be configured to implement an automatic authentication application 103b described in more detail below. In some implementations, the proxy configuration server 101 may be a dedicated server configured to host and serve proxy configuration files to the client devices 115a . . . 115n. In some implementations, the proxy configuration file may be a proxy auto-configuration (PAC) file that provides instructions to the web browser 113 or other HTTP agents on the client device 115 on how to automatically configure proxy settings for network connections based on predefined rules or conditions. The PAC file includes a piece of JavaScript code that instructs the web browser 113 whether to use a proxy server 120 and specifically which proxy server 120 and port number of the proxy server 120 to use for each HTTP request. For example, when the web browser 113 attempts to establish a network connection, it retrieves the PAC file and executes the JavaScript code within the PAC file to determine the right proxy server 120 and port number of the proxy server 120 to use for the specific HTTP request. The proxy configuration server 101 makes the proxy configuration files accessible to the client devices 115a . . . 115n via PAC Uniform Resource Locators (URLs). The PAC URLs may be pushed to the client devices 115a . . . 115n by a network administrator or by a Mobile Device Management (MDM) system (not shown in FIG. 1) used to manage, monitor, secure, and support the client devices 115a . . . 115n within an organization's network in an enterprise environment. In some implementations, a MDM system may embed payload information including a user identifier and a device identifier into the PAC URL. For example, the user foo@example.com of a client device 115 may get a PAC URL https://pacserver.example.com/default.pac?user=foo@example.com&device=abcd1234 from the MDM system. This PAC URL enables the proxy configuration server 101 configured to serve the PAC file to customize the PAC file for different users, for example, by setting the JavaScript variables to the user identifier and the device identifier present in the PAC URL. The PAC file does not alter HTTP requests from the client device 115 in any way. For example, the PAC file cannot rewrite request URLs or modify the request headers or body in any way. It should be understood that the proxy configuration server 101 is not limited to providing the above-noted acts and/or functionality and may include other network-accessible services.

In some implementations, the proxy configuration server 101 may be configured to send and receive data to and from other entities of the system 100 via the network 105. For example, the proxy configuration server 101 sends and receives data including instructions to and from the client device 115 and the plurality of proxy servers 120. In some implementations, the proxy configuration server 101 may also include database (not shown) coupled to it (e.g., over the network 105) to store structured data in a relational database and a file system (e.g., HDFS, NFS, etc.) for unstructured or semi-structured data. In some implementations, the proxy configuration server 101 may include an instance of a data storage 243 (shown in FIG. 2) that stores various types of data for access and/or retrieval by the automatic authentication application 103b. Although only a single proxy configuration server 101 is shown in FIG. 1, it should be understood that there may be any number of proxy configuration servers 101 or a server cluster.

In the example of FIG. 1, the components of each of the plurality of proxy servers 120 may be configured to implement an automatic authentication application 103c described in more detail below. The plurality of proxy servers 120 may communicate with one or more entities of the system 100, such as the plurality of web servers 125 and the proxy configuration server 101. The plurality of proxy servers 120 may include one or more of HTTP(s) proxies, SOCKS proxies, transparent proxies, etc. For example, an HTTP proxy server 120 acts as a bridge between a client device 115 and the plurality of web servers 125. When an HTTP agent on the client device 115, such as a web browser 113, makes a request to access a website or retrieve a web resource hosted by the web server 125, it sends the request to the HTTP proxy server 120 instead of directly contacting the web server 125. The HTTP proxy server 120 then routes the request to the web server 125 on behalf of the client device 115, retrieves the response from the web server 125, and sends it back to the client device 115. The plurality of proxy servers 120 may be used to provide content filtering, policy enforcement, enhance security, and auditing for companies, organizations (e.g., K-12 school districts), and home users.

The plurality of proxy servers 120 may be set up at various network levels, such as the individual client devices, local networks, or at the Internet Service Provider (ISP) level. In some implementations, the plurality of proxy servers 120 may be cloud-based proxy servers or distributed over the network 105. In some implementations, the plurality of proxy servers 120 may be deployed in one or more proxy server clusters for performing their functionality (e.g., content filtering, policy enforcement, etc.). A proxy server cluster includes a group of proxy servers 120 configured to handle a large number of concurrent proxy connections at the same time for scalability and high availability. For example, each instance of the proxy server 120 in the proxy server cluster may handle thousands of proxy connections at a time. A proxy server cluster may be uniquely identified by a proxy cluster ID or proxy host name. Each instance of the proxy server 120 in a cluster shares the same proxy host name. If one of the instances goes down, a load balancer or some kind of dispatch service can direct the incoming connection to another instance in the cluster. In some implementations, the proxy server cluster may also include database (not shown) coupled to it (e.g., over the network 105) to store structured data in a relational database and a file system (e.g., HDFS, NFS, etc.) for unstructured or semi-structured data. In some implementations, the proxy server 120 may include an instance of a data storage 243 (shown in FIG. 2) that stores various types of data for access and/or retrieval by the automatic authentication application 103c. It should be understood that the proxy server 120 is not limited to providing the above-noted acts and/or functionality and may include other network-accessible services.

In the example of FIG. 1, the system 100 may include a plurality of web servers 125. The plurality of web servers 125 may communicate with one or more entities of the system 100, such as the plurality of proxy servers 120 and the client devices 115a . . . 115n via the network 105. In some implementations, a web server 125 may include an online service 111 dedicated to providing access to various services and information resources hosted by the web server 125 via web, mobile, and/or cloud applications on the client device 115. The online service 111 may obtain and store user data, content items (e.g., videos, text, images, etc.), and interaction data reflecting the interaction of users with the content items. User data, as described herein, may include one or more of user profile information (e.g., user id, user preferences, user history, social network connections, etc.), logged information (e.g., clickstream, IP addresses, activity metrics, sleep quality data, calories and nutrient data, user device specific information, historical actions, etc.), and other user specific information. In some implementations, the online service 111 allows users to share content with other users (e.g., friends, contacts, public, similar users, etc.), purchase and/or view items (e.g., e-books, videos, music, games, gym merchandise, subscription, etc.), and other similar actions. For example, the online service 111 may provide various services such as physical fitness service; running and cycling tracking service; music streaming service; video streaming service; web mapping service; multimedia messaging service; electronic mail service; news service; news aggregator service; social networking service; photo and video-sharing social networking service; sleep-tracking service; diet-tracking and calorie counting service; ridesharing service; online banking service; online information database service; travel service; online e-commerce marketplace; ratings and review service; restaurant-reservation service; food delivery service; search service; health and fitness service; home automation and security service; Internet of Things (IOT), multimedia hosting, distribution, and sharing service; cloud-based data storage and sharing service; a data warehouse; a system of record (SOR); a combination of one or more of the foregoing services; or any other service where users retrieve, collaborate, and/or share information, etc. It should be noted that the list of items provided as examples for the online service 111 above are not exhaustive and that others are contemplated in the techniques described herein.

In the example of FIG. 1, the components of the web server 125 may be configured to implement an application programming interface (API). For example, the API may be a software interface exposed over the HTTP protocol by the web server 125. The API includes a set of requirements that govern and facilitate the movement of information between the components of FIG. 1. For example, the API exposes internal data and functionality of the online service 111 hosted by the web server 125 to API requests originating from the client device 115. Via the API, the client device 115 passes an authenticated request including a set of parameters for information to the online service 111 and receives an object (e.g., XML or JSON) with associated results from the online service 111. It should be understood that the web server 125 and its associated API may be representative of one online service provider and there may be multiple online service providers coupled to the network 105, each having its own server or a server cluster, applications, application programming interface, etc.

In some implementations, the proxy configuration server 101 and the proxy server 120 may be integrated into a single computing device for facilitating the functionalities as described herein and configured to be deployed on premises of a business, organization, home, etc. In other implementations, the proxy configuration server 101 and the proxy server 120 may be may be configured to be located and deployed remotely.

The automatic authentication application 103 may include software and/or logic to provide the functionality for implementing a non-interactive and automatic way of facilitating user authentication with a proxy server. In some implementations, the automatic authentication application 103 may be implemented using programmable or specialized hardware, such as a field-programmable gate array (FPGA) or an application-specific integrated circuit (ASIC). In some implementations, the automatic authentication application 103 may be implemented using a combination of hardware and software. In some implementations, the automatic authentication application 103 may be stored and executed on a combination of the client devices 115, the proxy server 120, and the proxy configuration server 101, or by any one of the client devices 115, the proxy server 120, or the proxy configuration server 101.

As depicted in FIG. 1, the automatic authentication application 103a, 103b, and 103c is shown in dotted lines to indicate that the operations performed by the automatic authentication application 103a, 103b, and 103c as described herein may be performed at the client device 115, the proxy configuration server 101, the proxy server 120, or any combinations of these components. In some implementations, each instance 103a, 103b, and 103c may include one or more components of the automatic authentication application 103 depicted in FIG. 2, and may be configured to fully or partially perform the functionalities described herein depending on where the instance resides. In some implementations, the automatic authentication application 103 may be a thin-client application with some functionality executed on the client device 115 and additional functionality executed on the proxy configuration server 101 and the proxy server 120. In some implementations, the automatic authentication application 103 may generate and present various user interfaces to perform these acts and/or functionality, which may in some cases be based at least in part on information received from the proxy configuration server 101, the client device 115, and/or the proxy servers 120 via the network 105.

In some implementations, the automatic authentication application 103 is code operable in a web browser, a web application accessible via a web browser, a native application (e.g., mobile application, installed application, etc.) on the client device 115, a plug-in or an extension, a combination thereof, etc. Additional structure, acts, and/or functionality of the automatic authentication application 103 is further discussed below with reference to at least FIG. 2. While the automatic authentication application 103 is described below as a stand-alone component, in some implementations, the automatic authentication application 103 may be part of other applications in operation on the client device 115, the proxy configuration server 101, and the proxy server 120.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 101 to a client device 115, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
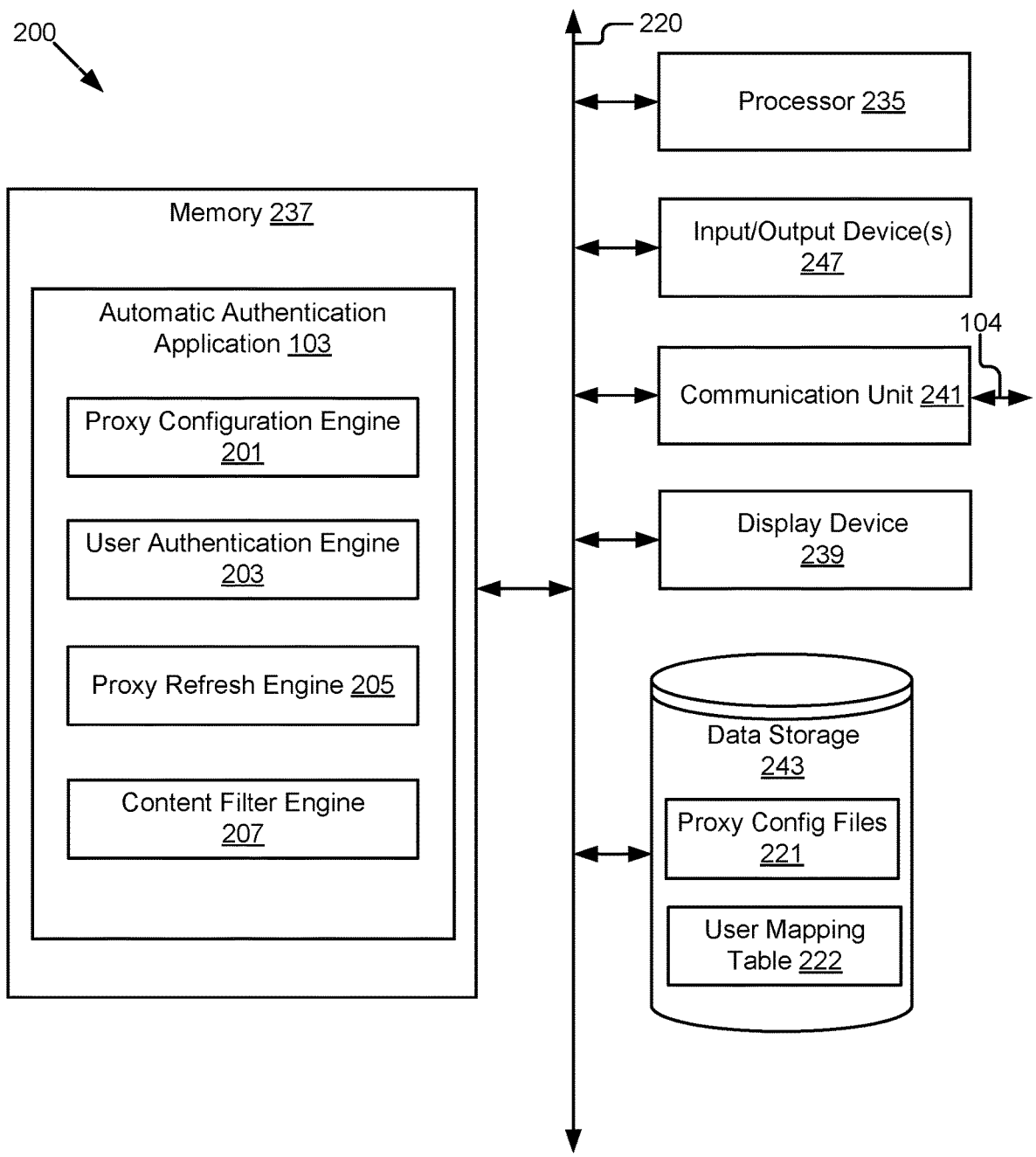
FIG. 2 is a block diagram illustrating one implementation of an example computing device including an automatic authentication application.

FIG. 2 is a block diagram illustrating one implementation of a computing device 200 including an automatic authentication application 103. The computing device 200 may also include a processor 235, a memory 237, a display device 239, a communication unit 241, an input/output device(s) 247, and a data storage 243, according to some examples. The components of the computing device 200 are communicatively coupled by a bus 220. In some implementations, the computing device 200 may be the client device 115, the proxy configuration server 101, the proxy server 120, or a combination of the client device 115, the proxy configuration server 101, and the proxy server 120. In such implementations where the computing device 200 is the client device 115, the proxy configuration server 101 or the proxy server 120, it should be understood that it may take other forms and include additional or fewer components without departing from the scope of the present disclosure. For example, while not shown, the computing device 200 may include sensors, capture devices, additional processors, and other physical configurations. Additionally, it should be understood that the computer architecture depicted in FIG. 2 could be applied to other entities of the system 100 with various modifications, including, for example, the web servers 125.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device 239, supporting the display of images, capturing and transmitting images, and performing complex tasks including various types of feature extraction and sampling. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the display device 239, the input/output device(s) 247, the automatic authentication application 103, and the data storage 243.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, as depicted in FIG. 2, the memory 237 may store the automatic authentication application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 may include a communication bus for transferring data between components of the computing device 200 or between computing device 200 and other components of the system 100 via the network 105 or portions thereof, a processor mesh, a combination thereof, etc. In some implementations, the automatic authentication application 103 and various other software operating on the computing device 200 (e.g., an operating system, device drivers, etc.) may cooperate and communicate via a software communication mechanism implemented in association with the bus 220. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.).

The display device 239 may be any conventional display device, monitor or screen, including but not limited to, a liquid crystal display (LCD), light emitting diode (LED), organic light-emitting diode (OLED) display or any other similarly equipped display device, screen or monitor. The display device 239 represents any device equipped to display user interfaces, electronic images, and data as described herein. In different embodiments, the display device 230 may output display in binary (only two different values for pixels), monochrome (multiple shades of one color), or multiple colors and shades. The display device 239 is coupled to the bus 220 for communication with the processor 235 and the other components of the computing device 200. In some implementations, the display device 239 may be a touch-screen display device capable of receiving input from one or more fingers of a user. For example, the display device 239 may be a capacitive touch-screen display device capable of detecting and interpreting multiple points of contact with the display surface. In some implementations, the computing device 200 (e.g., client device 115) may include a graphics adapter (not shown) for rendering and outputting the images and data for presentation on display device 239. The graphics adapter (not shown) may be a separate processing device including a separate processor and memory (not shown) or may be integrated with the processor 235 and memory 237.

The input/output (I/O) device(s) 247 may include any standard device for inputting or outputting information and may be coupled to the computing device 200 either directly or through intervening I/O controllers. In some implementations, the I/O device 247 may include one or more peripheral devices. Non-limiting example I/O devices 247 include a touch screen or any other similarly equipped display device equipped to display user interfaces, electronic images, and data as described herein, a touchpad, a keyboard, a scanner, a stylus, an audio reproduction device (e.g., speaker), a microphone array, a barcode reader, an eye gaze tracker, a sip-and-puff device, and any other I/O components for facilitating communication and/or interaction with users. In some implementations, the functionality of the input/output device 247 and the display device 239 may be integrated, and a user of the computing device 200 (e.g., client device 115) may interact with the computing device 200 by contacting a surface of the display device 239 using one or more fingers. For example, the user may interact with an emulated (i.e., virtual or soft) keyboard displayed on the touch-screen display device 239 by using fingers to contact the display in the keyboard regions.

The communication unit 241 is hardware for receiving and transmitting data by linking the processor 235 to the network 105 and other processing systems via signal line 104. The communication unit 241 may receive data such as user input from the client device 115 and transmits the data to the automatic authentication application 103, for example a user interaction to requesting to access a website. The communication unit 241 also transmits information including on-demand data segments to the client device 115 for display, for example, in response to the user interaction. The communication unit 241 is coupled to the bus 220. In some implementations, the communication unit 241 may include a port for direct physical connection to the client device 115 or to another communication channel. For example, the communication unit 241 may include an RJ45 port or similar port for wired communication with the client device 115. In other implementations, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In other implementations, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In yet other implementations, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. In some implementations, the data storage 243 may be coupled to the components 235, 237, 239, 241, and 247 via the bus 220 to receive and provide access to data. In some implementations, the data storage 243 may store data received from other elements of the system 100 including, for example, entities 101, 115, 120, 125, and/or the automatic authentication applications 103, and may provide data access to these entities. The data storage 243 may store, among other data, proxy configuration files 221, user mapping table data 222, etc. The data storage 243 stores data associated with implementing a non-interactive and automatic way of facilitating user authentication with a proxy server and other functionality as described herein. The data stored in the data storage 243 is described below in more detail.

The data storage 243 may be included in the computing device 200 or in another computing device and/or storage system distinct from but coupled to or accessible by the computing device 200. The data storage 243 may include one or more non-transitory computer-readable mediums for storing the data. In some implementations, the data storage 243 may be incorporated with the memory 237 or may be distinct therefrom. The data storage 243 may be a dynamic random-access memory (DRAM) device, a static random-access memory (SRAM) device, flash memory, or some other memory devices. In some implementations, the data storage 243 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In some implementations, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

It should be understood that other processors, operating systems, sensors, displays, and physical configurations are possible.

As depicted in FIG. 2, the memory 237 may include the automatic authentication application 103 and optionally the browser 113 (e.g., in the implementation of the client device 115). In some implementations, the automatic authentication application 103 may include a proxy configuration engine 201, a user authentication engine 203, a proxy refresh engine 205, and a content filter engine 207. The components of the automatic authentication application 103 may each include software and/or logic to provide their respective functionality. In some implementations, the components of the automatic authentication application 103 may each be implemented using programmable or specialized hardware including a field-programmable gate array (FPGA) or an application-specific integrated circuit (ASIC). In some implementations, the components of the automatic authentication application 103 may each be implemented using a combination of hardware and software executable by the processor 235. In some implementations, the components of the automatic authentication application 103 may each be sets of instructions stored in the memory 237 and configured to be accessible and executable by the processor 235 to provide their acts and/or functionality. In some implementations, the components of the automatic authentication application 103 may each be adapted for cooperation and communication with the processor 235, the memory 237, and other components of the computing device 200 via the bus 220. In some implementations, the components of the automatic authentication application 103 may send and receive data, via the communication unit 241, to and from one or more of the client devices 115, the proxy configuration server 101, the proxy servers 120, and web servers 125.

The proxy configuration engine 201 may include software and/or logic to provide the functionality for managing a user mapping table on the backend, generating a proxy configuration file, and serving the proxy configuration file to a requesting client device 115. In some implementations, the proxy configuration engine 201 of the automatic authentication application 103a implemented on a client device 115 determines a request to access a web server 125 by a HTTP agent on the client device 115. For example, the HTTP agent or HTTP Secure agent may be a web browser 113. When a user accesses a website through a web browser 113, the web browser 113 acts an HTTP agent and sends HTTP requests to retrieve requested web resources, such as web pages, images, documents, or any other content hosted by the web server 125. Before an HTTP resource (e.g. an HTML page) is loaded, the HTTP agent sends a request to retrieve a proxy configuration file from a URL assigned to the client device 115. For example, the URL may be pushed to the client device 115 by an MDM system and the location of the proxy configuration file may be on the proxy configuration server 101.

Figure 3:
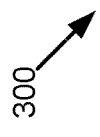
FIG. 3 shows a graphical representation illustrating an implementation of an example user mapping table.

In some implementations, the proxy configuration engine 201 of the automatic authentication application 103b implemented in the proxy configuration server 101 identifies one or more parameters including the user identifier and the device identifier embedded in the URL. The proxy configuration engine 201 also determines a public IP address of the client device 115 from which the request to retrieve the proxy configuration file originated. The proxy configuration engine 201 then accesses a user mapping table 222 stored in the data storage 243. FIG. 3 shows a graphical representation 300 illustrating an implementation of an example user mapping table 222. The user mapping table 222 includes a tuple of proxy connection information as a row 312. The columns of the user mapping table 222 include a cluster ID 302, a client public IP address 304, a proxy port number 306, a client device ID 308, and a user ID 310.

In some implementations, the proxy configuration engine 201 of the automatic authentication application 103b implemented in the proxy configuration server 101 looks up the user mapping table 222 using the public IP address of the client device 115 as a key and determines a port number of a proxy server cluster that is available (e.g., from a pool) to assign to the public IP address. The proxy configuration engine 201 creates a tuple or set of proxy connection information including the public IP address, the host name of the proxy server cluster, and the port number of the proxy server cluster. In some implementations, the proxy configuration engine 201 updates the user mapping table 222 with an entry for the newly created set of proxy connection information corresponding to the user identifier. In some implementations, the proxy configuration engine 201 associates the entry for the newly created set of proxy connection information to the device identifier in the user mapping table 222. In some other implementations, the proxy configuration engine 201 associates the entry for the newly created set of proxy connection information to the user identifier and the device identifier in the user mapping table 222. The proxy configuration engine 201 generates a proxy configuration file 221 using the set of proxy connection information and stores the proxy configuration file 221 in the data storage 243. For example, the proxy configuration engine 201 generates a proxy-auto configuration (PAC) script that includes rules and conditions written in a proxy auto-configuration language, such as a JavaScript-based language. The rules and conditions in the PAC script may be based on factors, such as the requested URL, the public IP address of the client or the web server, the network location, time of day, type of content being accessed, etc. In some implementations, the proxy configuration engine 201 also generates a unique device identifier (e.g., Universal Unique Identifier (UUID)) and associates it with the generated proxy configuration file 221 so that the PAC script on the client device 115 may use it to identify itself to the proxy configuration server 101 and the proxy server 120. The UUID may correspond to the client device ID 308 in the user mapping table 222. The proxy configuration engine 201 sends a response including the proxy configuration file 221 to the HTTP agent on the client device 115. In some implementations, the proxy configuration engine 201 shares the user mapping table 222 including associated updates that occur to the user mapping table 222 with the plurality of proxy servers 120.

In some implementations, the proxy configuration engine 201 of the automatic authentication application 103a implemented on the client device 115 retrieves the proxy configuration file 221 from the proxy configuration server 101. The proxy configuration engine 201 forwards the proxy configuration file 221 to the HTTP agent on the client device 115. For example, the HTTP agent may execute the JavaScript code in the proxy configuration file 202 within a sandbox. The proxy configuration engine 201 determines a host name and a port number of a proxy server cluster corresponding to the HTTP request using the proxy configuration file 202. For example, the JavaScript code in the proxy configuration file 202 includes a function that when executed takes the URL and host name of the requested web server as input and returns the host name and port number of the proxy server cluster to be used for the request. The proxy configuration engine 201 instructs the HTTP agent to route the request from the client device 115 to the corresponding proxy server 120 using the host name and port number of the proxy server cluster.

The user authentication engine 203 may include software and/or logic to provide the functionality for automatically authenticating a user of the client device 115 with a proxy server 120. In some implementations, the user authentication engine 203 of the automatic authentication application 103c implemented on the proxy server 120 determines a connection between the client device 115 and the proxy server 120 when the client device 115 connects to the proxy server cluster and port number designated by the proxy configuration file 221. The user authentication engine 203 determines a tuple or set of proxy connection information associated with the connection. For example, the set of proxy connection information may be referred to as a proxy connection fingerprint. The proxy connection fingerprint is a combination of the public IP address of the client device 115, the host name of the proxy server 120, and a port number of the proxy server 120 that creates a unique identifier for the user of the client device 115. The user authentication engine 203 accesses the user mapping table 222 stored in the data storage 243 to look up the user mapping table 222 using the proxy connection fingerprint as a key and uniquely identifies the user of the client device 115 based on the look up. For example, a set of the cluster ID (e.g., 112), the client IP address (e.g., 172.217.175.78), and the proxy port number (e.g., port 20100) in the user mapping table 222 in FIG. 3 maps to a user ID (fool@example.com) and a client device ID (e.g., abc123) respectively. The user authentication engine 203 is configured to uniquely identify the user of the client device 115 without redirecting the HTTP agent to an interactive login page at the client device 115. In other words, the user authentication engine 203 non-interactively and automatically authenticates user identity using the set of proxy connection information when the client device 115 connects to the proxy server cluster and port number.

The proxy refresh engine 205 may include software and/or logic to provide the functionality for facilitating a refresh of the proxy configuration file at the client device 115. The proxy server information including the proxy server cluster ID or proxy host name and associated port number that the client device 115 receives from the proxy configuration engine 101 in the proxy configuration file may become obsolete. For example, the client device 115 may have roamed to a different network location with a different public IP address and has not refreshed the proxy connection information in the proxy configuration file 221. In another example, the client device 115 may become idle for a period of time. Either the proxy configuration server 101 or the proxy server 120 may then remove the mapping of the initial set of proxy connection information for the corresponding user and/or device from the user mapping table 222 as a way to conserve server resources because of the limited number of available proxy server ports. In some implementations, the proxy configuration engine 201 may select one or more of First In, First Out (FIFO), Least Recently Used (LRU), Least Frequently Used (LFU), or any other memory management algorithms to remove the mapping entries from the user mapping table 222.

In some implementations, the proxy refresh engine 205 of the automatic authentication application 103a implemented on the client device 115 periodically refreshes or renews the set of proxy connection information in the proxy configuration file 221 using Domain Name System (DNS) protocol. The HTTP agent (e.g., web browser 113) on the client device 115 may support a set of functions explicitly made available for use in the proxy configuration file 221. One such function is the 'dnsResolve' function which the proxy configuration file 221 may use to communicate with the outside world. The 'dnsResolve' function resolves a hostname and gets back a resolved IP address. The proxy refresh engine 205 sends a DNS resolution request (e.g., DNS query) in association with the proxy configuration file 221 from the client device 115 to a DNS server to check if the current proxy server information is still valid for the user. For example, the DNS query may be composed using one or more of the user identifier, the device identifier, the proxy server port number, etc. In some implementations, the DNS server may be operated by the organization managing the proxy configuration server 101, the plurality of proxy servers 120, or both. The proxy configuration file 221 may include a JavaScript function to compose the DNS resolution request using fake host names. That is, before an HTTP resource is loaded, the HTTP agent on the client device 115 calls a function "FindProxyForURL (url, host)" in the proxy configuration file 221 with the URL that is being requested. The proxy configuration file 221 may then be scripted to compose fake host names using the information that the HTTP agent has supplied and the proxy connection information found in the proxy configuration file 221. For example, a fake host name "james.20001.isvalid.pac.example.com" may mean whether the proxy port "20001" is still valid for user "James." The DNS server may return an IP address encoding the response. For example, the DNS server may return an IP address 5.1.10.0 (IP version 4 address), in other words, a 32-bit integer encoding the actual response as follows: the '5' can be considered as padding and discarded, the '1' can be identified as the proxy cluster ID, and the '10.0' when converted to hex '2560' can be identified as the port number. In case the response cannot fit into the 32-bit integer, the proxy refresh engine 205 may issue additional DNS queries in association with the proxy configuration file 221 to the DNS server to retrieve other parts of the response. The DNS server caches the responses to the DNS queries in its cache for a period indicated by Time to Live (TTL).

In some implementations, the DNS server may cooperate with the proxy configuration engine 201 and/or the proxy refresh engine 205 residing in the automatic authentication application 103 implemented on the proxy server 120 and the proxy configuration server 101 to perform its functionalities as described herein. In some implementations, the DNS server may first check if a mapping from a device identifier in the DNS query to a set of proxy connection information exists in the user mapping table 222. If so, the DNS server may return the set of proxy connection information to the script in the proxy configuration file 221 on the client device 115 with a TTL in the order of a few minutes. At the same time or close to it, the DNS server may extend the expiration of the set of the proxy connection information in the user mapping table 222. If the mapping from the device identifier in the DNS query to the set of proxy connection information does not exist in the user mapping table 222, the DNS server determines that the set of proxy connection information has expired or been reclaimed in the user mapping table 222. However, the DNS server cannot simply create a mapping of another set of proxy connection information corresponding to the device identifier and return it to the client device 115.

The information in the proxy configuration file 221 on the client device 115 that can be trusted by the DNS server includes the user identifier and the proxy server port number. The DNS server needs the public IP address of the client device 115 as a key to look up the user mapping table 222. The DNS server performs an additional step to confirm the public IP address of the client device 115 to be able to create a set of proxy connection information.

The DNS server may send a response including a host name and a port number of a special proxy server cluster to the client device 115 to connect next with a short TTL (e.g., a few seconds). This combination of the special proxy server cluster and the port number may be referred to as a "temporary mapping." A special proxy server cluster is used to ensure that there are free port numbers available within the cluster. When the client device 115 connects to the special proxy server cluster and port number, the DNS server determines a mapping of the special proxy server cluster and the port number to the previous remembered state information of the device identifier and the user identifier in the DNS query. As a result of the connection, the special proxy server cluster may determine the public IP address of the client device 115 requesting to refresh the proxy connection information in the proxy configuration file 221. In some implementations, the special proxy server cluster may look up the device identifier and/or the user identifier corresponding to the discovered public IP address in the user mapping table 222 to find an existing set of proxy connection information or create a new set of proxy connection information that serves an ordinary proxy server cluster information on a "permanent mapping" basis. The special proxy server cluster may continue to proxy the requests from the client device 115 until the TTL expires. After the "temporary mapping" expires, the DNS server retrieves the already created set of proxy connection information mapped to the device identifier in response to the next DNS query received in association with the proxy configuration file 221 from the client device 115.

In some implementations, the proxy refresh engine 205 may facilitate refreshing or renewing a set of proxy connection information in one DNS resolution request by supplying the client device public IP address, user identifier, and device identifier to the DNS server. The proxy refresh engine 205 obtains the client device public IP address in the script of the proxy configuration file 221. The proxy configuration file 221 on the client device 115 may not be able to obtain the public IP address of the client device 115. However, the proxy configuration file 221 may discover the public IP address of the client device 115 when the proxy server 120 redirects the HTTP request from the client device 115 to a specially formed host name or URL that embeds the public IP address of the client device 115. The configuration file 221 may then record the public IP address of the client device 115 for use in the DNS resolution request.

In some implementations, the proxy refresh engine 205 may facilitate with detecting network changes in the script of the proxy configuration file 221. It is important that the client devices 115 obtain new set of proxy connection information mapping in the user mapping table 222 as soon as they move to different network locations because their public IP addresses likely changes during the process, rendering the original set of proxy connection information in the proxy configuration file 221 obsolete. The proxy refresh engine 205 partially solves this problem by periodically re-obtaining the set of proxy connection information in association with the proxy configuration file 221 on the client device 115. If the proxy server 120 detects from the public IP addresses that the client device 115 has not moved, the current set of proxy connection information may continue to be used. However, such a method may cause the proxy configuration file 221 to continue to use the obsolete set of proxy connection information before the periodic check occurs, which may cause the proxy servers 120 to fail to proxy the HTTP requests. The HTTP agent (e.g., web browser 113) on the client device 115 may support the 'myIpAddress' function in the script of the proxy configuration file 221. The 'myIpAddress' function returns the local public IP address of the client device 115. When there is a network change, the local public IP addresses usually change as a result of the new Dynamic Host Configuration Protocol (DHCP) responses. The proxy refresh engine 205 in association with the proxy configuration file 221 may detect such a local public IP address change and proactively send a DNS resolution request to the DNS server for a new set of proxy connection information.

The content filter engine 207 may include software and/or logic to provide the functionality for facilitating enforcing of content filtering and access control policies at the client device 115. Once the identity of the user of the client device 115 is established by the user authentication engine 203, the content filter engine 207 correctly applies the content enforcement policies to the HTTP requests from the client device 115 and filter the retrieved content on the client device 115 accordingly.

Figure 4:
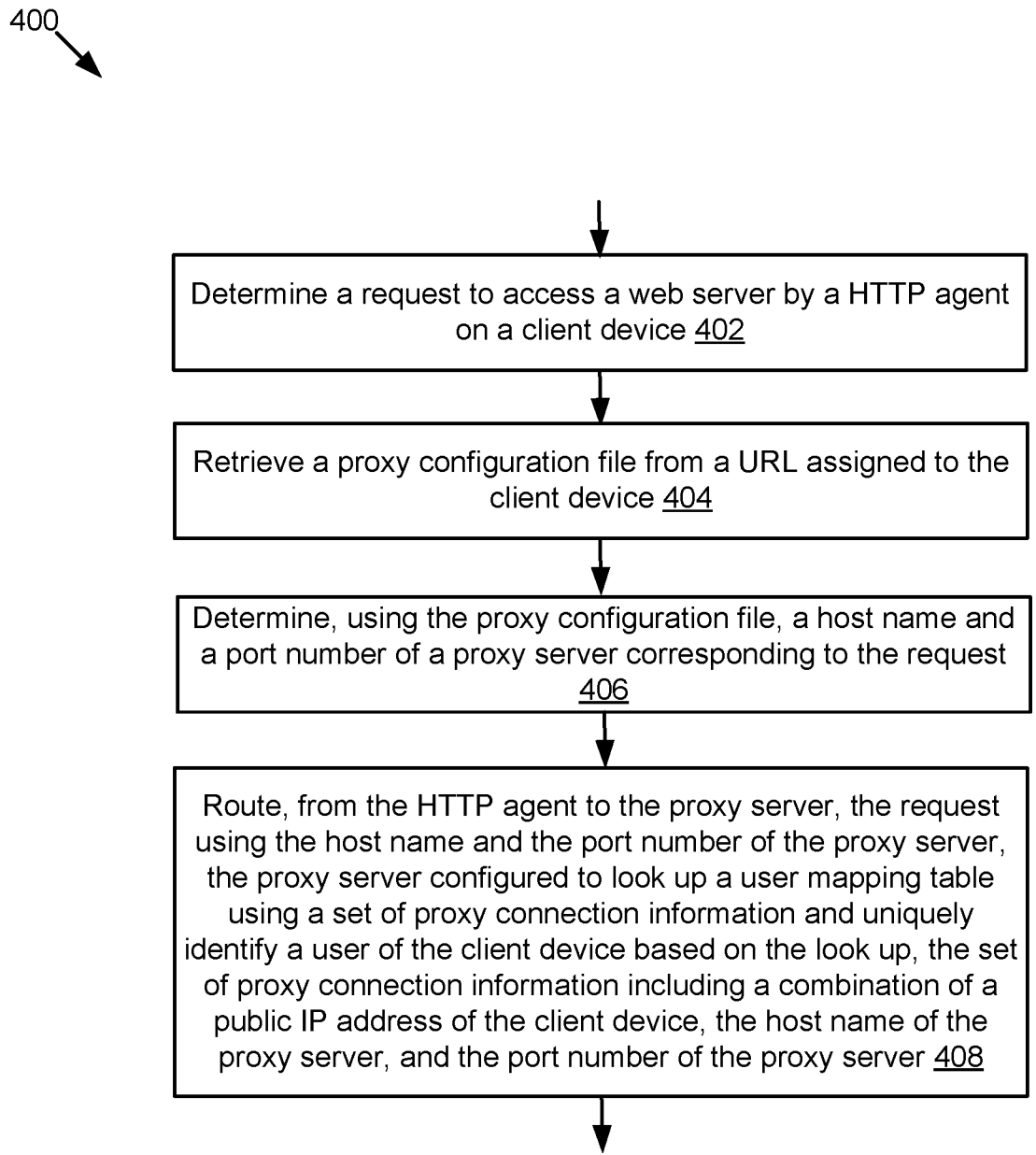
FIG. 4 is a flow diagram illustrating one implementation of an example method for uniquely identifying a user using a set of proxy connection information.

FIG. 4 is a flow diagram illustrating one implementation of an example method 400 for uniquely identifying a user using a set of proxy connection information. The method 400 may be performed by a system of one or more computing devices in one or more locations, including, for example, the proxy configuration server 101, the proxy server 120, and the client device 115 of FIG. 1.

At 402, the proxy configuration engine 201 determines a request to access a web server by a Hypertext Transfer Protocol (HTTP) agent on a client device. At 404, the proxy configuration engine 201 retrieves a proxy configuration file from a Uniform Resource Locator (URL) assigned to the client device. At 406, the proxy configuration engine 201 determines a host name and a port number of a proxy server corresponding to the request using the proxy configuration file. At 408, the proxy configuration engine 201 routes the request using the host name and the port number of the proxy server from the HTTP agent to the proxy server, wherein the proxy server is configured to look up a user mapping table using a set of proxy connection information and uniquely identify a user of the client device based on the look up, the set of proxy connection information including a combination of a public Internet Protocol (IP) address of the client device, the host name of the proxy server, and the port number of the proxy server.

Figure 5:
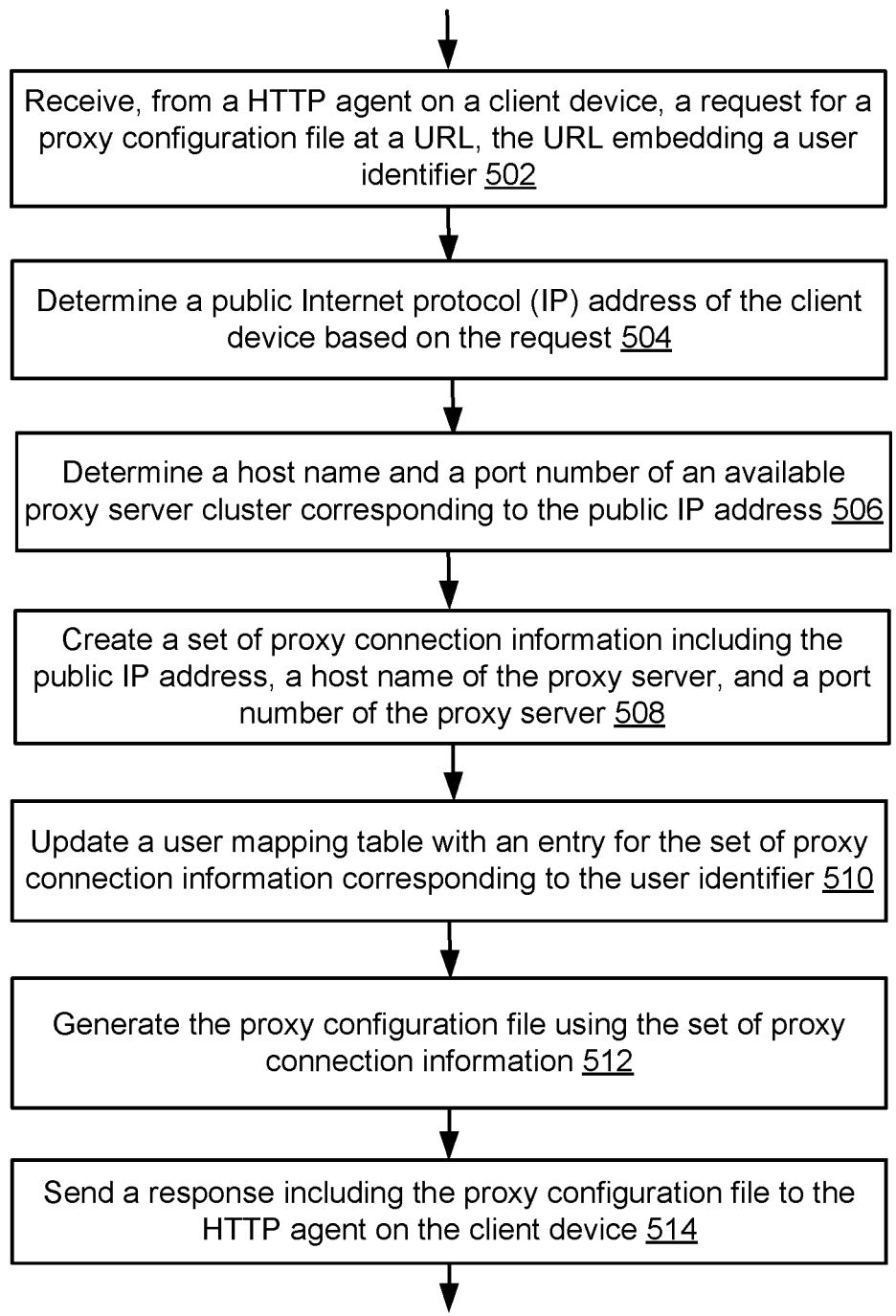
FIG. 5 is a flow diagram illustrating one implementation of an example method for creating a user mapping table.

FIG. 5 is a flow diagram illustrating one implementation of an example method 500 for creating a user mapping table. The method 500 may be performed by a system of one or more computing devices in one or more locations, including, for example, the proxy configuration server 101, the proxy server 120, and the client device 115 of FIG. 1.

At 502, the proxy configuration engine 201 receives a request for a proxy configuration file at a URL, the URL embedding a user identifier. At 504, the proxy configuration engine 201 determines a public IP address of the client device based on the request. At 506, the proxy configuration engine 201 determines a host name and a port number of an available proxy server cluster corresponding to the public IP address. At 508, the proxy configuration engine 201 creates a set of proxy connection information including the public IP address, a host name of the proxy server, and a port number of the proxy server. At 510, the proxy configuration engine 201 updates a user mapping table with an entry for the set of proxy connection information corresponding to the user identifier. At 512, the proxy configuration engine 201 generates the proxy configuration file using the set of proxy connection information. At 514, the proxy configuration engine 201 sends the response including the proxy configuration file to the HTTP agent on the client device.

Figure 6:
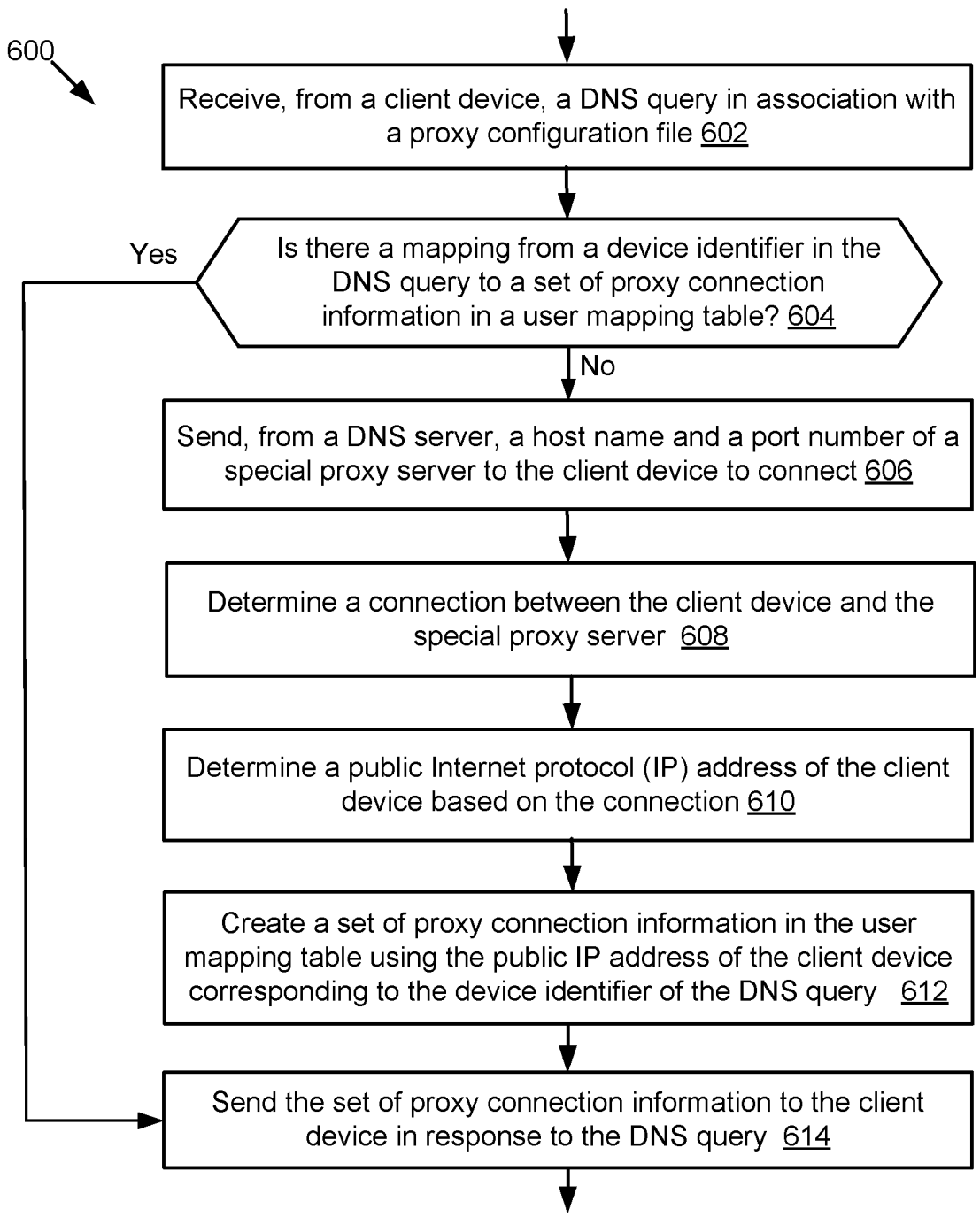
FIG. 6 is a flow diagram illustrating one implementation of an example method for refreshing proxy connection information via a proxy configuration file.

FIG. 6 is a flow diagram illustrating one implementation of an example method 600 for refreshing proxy connection information via a proxy configuration file. The method 600 may be performed by a system of one or more computing devices in one or more locations, including, for example, the proxy configuration server 101, the proxy server 120, and the client device 115 of FIG. 1.

At 602, the proxy refresh engine 205 receives a DNS query in association with a proxy configuration file from a client device. At 604, the proxy configuration engine 201 determines whether there is a mapping from a device identifier in the DNS query to a set of proxy connection information in a user mapping table. If there is a mapping from the device identifier in the DNS query to the set of proxy connection information in the user mapping table, at 614, the proxy refresh engine 205 sends the set of proxy connection information to the client device in response to the DNS query.

If there is no mapping from the device identifier in the DNS query to the set of proxy connection information in the user mapping table, at 606, the proxy configuration engine 201 sends a host name and a port number of a special proxy server to the client device to connect from the DNS server. At 608, the proxy configuration engine 201 determines a connection between the client device and the special proxy server. At 610, the proxy configuration engine 201 determines a public IP address of the client device based on the connection. At 612, the proxy configuration engine 201 creates a set of proxy of connection information in the user mapping table using the public IP address of the client device corresponding to the device identifier of the DNS query. At 614, the proxy refresh engine 205 sends the set of proxy connection information to the client device in response to the DNS query.

A system and method for implementing a non-interactive and automatic way of facilitating user authentication with a proxy server has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the present invention applies to any type of computing system that can receive data and commands, and present information as part of any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web- Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining a request to access a web server by a Hypertext Transfer Protocol (HTTP) agent on a client device;
   retrieving a proxy configuration file from a Uniform Resource Locator (URL) assigned to the client device;
   periodically refreshing a set of proxy connection information included in the proxy configuration file using Domain Name System (DNS) protocol, wherein periodically refreshing the set of proxy connection information included in the proxy configuration file comprises:
      sending a DNS query in association with the proxy configuration file to a DNS server, wherein the DNS query includes one or more of a user identifier, a device identifier, and a port number of a proxy server forming a fake host name; and
      receiving a response encoded in an Internet Protocol (IP) address from the DNS server;
   determining, using the proxy configuration file, a host name and a port number of a proxy server corresponding to the request; and
   routing, from the HTTP agent to the proxy server, the request using the host name and the port number of the proxy server, the proxy server configured to look up a user mapping table using the set of proxy connection information and uniquely identify a user of the client device based on the look up of the user mapping table, the set of proxy connection information including a combination of a public IP address of the client device, the host name of the proxy server, and the port number of the proxy server.

2. The computer-implemented method of claim 1, wherein retrieving the proxy configuration file from the URL assigned to the client device comprises:
   sending, from the HTTP agent to a proxy configuration server, a request for the proxy configuration file at the URL; and
   receiving, from the proxy configuration server, a response including the proxy configuration file.

3. The computer-implemented method of claim 2, wherein the proxy configuration server is configured to perform operations comprising:
   identifying a parameter including a user identifier of the user in the URL;
   determining a public IP address of the client device based on the request for the proxy configuration file;
   determining a host name and a port number of an available proxy server cluster corresponding to the public IP address;
   creating a set of proxy connection information including the public IP address, the host name and the port number of the available proxy server cluster;
   updating the user mapping table with an entry for the set of proxy connection information corresponding to the user identifier; and
   generating the proxy configuration file using the set of proxy connection information.

4. The computer-implemented method of claim 1, wherein periodically refreshing the set of proxy connection information included in the proxy configuration file comprises:
   detecting a change in network location of the client device.

5. The computer-implemented method of claim 1, further comprising:
   responsive to the user of the client device being uniquely identified based on the look up of the user mapping table, applying a content enforcement policy to the request; and
   filtering content retrieved from the web server on the client device based on applying the content enforcement policy.

6. The computer-implemented method of claim 1, wherein the DNS server is configured to perform operations comprising:
   determining whether a mapping from a device identifier in the DNS query to a set of proxy connection information is present in the user mapping table;
   responsive to determining that the mapping from the device identifier in the DNS query to the set of proxy connection information is absent in the user mapping table, sending a host name and a port number of a special proxy server cluster to the client device to connect;

determining a connection between the client device and the special proxy server cluster;

determining a public IP address of the client device based on the connection;

creating a set of proxy connection information in the user mapping table using the public IP address of the client device corresponding to the device identifier in the DNS query; and sending the set of proxy connection information to the client device.

7. The computer-implemented method of claim 6, further comprising:

responsive to determining that the mapping from the device identifier in the DNS query to the set of proxy connection information is present in the user mapping table, extending an expiration of the set of proxy connection information in the user mapping table.

8. The computer-implemented method of claim 1, wherein the proxy server is configured to uniquely identify the user of the client device without redirecting the HTTP agent to an interactive login at the client device.

9. The computer-implemented method of claim 1, wherein the HTTP agent includes a web browser.

10. The computer-implemented method of claim 1, wherein the URL includes an embedding of a user identifier and a device identifier.

11. The computer-implemented method of claim 1, wherein the proxy configuration file includes a proxy auto-configuration (PAC) file.

12. The computer-implemented method of claim 1, wherein the response encoded in the IP address from the DNS server is cached for a period indicated by Time to Live (TTL).

13. A system comprising:
one or more processors; and
a memory, the memory storing instructions, which when executed cause the one or more processors to:
determine a request to access a web server by a Hypertext Transfer Protocol (HTTP) agent on a client device;
retrieve a proxy configuration file from a Uniform Resource Locator (URL) assigned to the client device;
periodically refresh, using Domain Name System (DNS) protocol, a set of proxy connection information included in the proxy configuration file by:
sending a DNS query in association with the proxy configuration file to a DNS server, wherein the DNS query includes one or more of a user identifier, a device identifier, and a port number of a proxy server forming a fake host name; and
receiving a response encoded in an Internet Protocol (IP) address from the DNS server;
determine, using the proxy configuration file, a host name and a port number of a proxy server corresponding to the request; and
route, from the HTTP agent to the proxy server, the request using the host name and the port number of the proxy server, the proxy server configured to look up a user mapping table using the set of proxy connection information and uniquely identify a user of the client device based on the look up of the user mapping table, the set of proxy connection information including a combination of a public IP address of the client device, the host name of the proxy server, and the port number of the proxy server.

14. The system of claim 13, wherein to retrieve the proxy configuration file from the URL assigned to the client device, the instructions further cause the one or more processors to:

send, from the HTTP agent to a proxy configuration server, a request for the proxy configuration file at the URL; and receive, from the proxy configuration server, a response including the proxy configuration file.

15. The system of claim 14, wherein the proxy configuration server is configured to:

identify a parameter including a user identifier of the user in the URL;

determine a public IP address of the client device based on the request for the proxy configuration file;

determine a host name and a port number of an available proxy server cluster corresponding to the public IP address;

create a set of proxy connection information including the public IP address, the host name and the port number of the available proxy server cluster;

update the user mapping table with an entry for the set of proxy connection information corresponding to the user identifier; and generate the proxy configuration file using the set of proxy connection information.

16. The system of claim 13, wherein to periodically refresh the set of proxy connection information included in the proxy configuration file, the instructions further cause the one or more processors to:

detect a change in network location of the client device.

17. The system of claim 13, wherein the instructions further cause the one or more processors to:

apply a content enforcement policy to the request responsive to the user of the client device being uniquely identified based on the look up of the user mapping table; and filter content retrieved from the web server on the client device based on applying the content enforcement policy.

18. The system of claim 13, wherein the DNS server is configured to:

determine whether a mapping from a device identifier in the DNS query to a set of proxy connection information is present in the user mapping table;

responsive to determining that the mapping from the device identifier in the DNS query to the set of proxy connection information is absent in the user mapping table, send a host name and a port number of a special proxy server cluster to the client device to connect;

determine a connection between the client device and the special proxy server cluster;

determine a public IP address of the client device based on the connection;

create a set of proxy connection information in the user mapping table using the public IP address of the client device corresponding to the device identifier in the DNS query; and send the set of proxy connection information to the client device.

19. The system of claim 18, wherein the instructions further cause the one or more processors to:

responsive to determining that the mapping from the device identifier in the DNS query to the set of proxy connection information is present in the user mapping table, extend an expiration of the set of proxy connection information in the user mapping table.

20. The system of claim 13, wherein the proxy server is configured to uniquely identify the user of the client device without redirecting the HTTP agent to an interactive login at the client device.

* * * * *